(12) United States Patent
Cho

(10) Patent No.: US 10,698,478 B2
(45) Date of Patent: Jun. 30, 2020

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventor: Eun-nim Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/819,608

(22) Filed: Aug. 6, 2015

(65) Prior Publication Data

US 2016/0054796 A1    Feb. 25, 2016

(30) Foreign Application Priority Data

Aug. 20, 2014   (KR) .......................... 10-2014-0108546

(51) Int. Cl.
*G06F 3/01*      (2006.01)
*H04N 13/366*  (2018.01)
(Continued)

(52) U.S. Cl.
CPC .............. *G06F 3/013* (2013.01); *G06F 3/147* (2013.01); *G06K 9/0061* (2013.01); *G06T 3/00* (2013.01);
(Continued)

(58) Field of Classification Search
CPC ............ G09G 5/00; G09G 5/14; G09G 5/003; G09G 2380/02; G09G 2358/00;
(Continued)

(56) References Cited

U.S. PATENT DOCUMENTS

2003/0090495 A1*   5/2003  Tomita .................. G06F 1/1626
                                                                    345/619
2010/0056223 A1*   3/2010  Choi ..................... G06F 1/1601
                                                                    455/566

(Continued)

FOREIGN PATENT DOCUMENTS

CN         101815188        8/2010
CN         102150413        8/2011
(Continued)

OTHER PUBLICATIONS

European Search Report dated Jan. 15, 2016 issued in corresponding European Patent Application 15181586.7.

(Continued)

*Primary Examiner* — Ibrahim A Khan
(74) *Attorney, Agent, or Firm* — Staas & Halsey

(57) ABSTRACT

A display apparatus including: a display configured to include a curved display surface; a processor configured to process an image signal to be displayed as an image on the display; a detector configured to detect a position of a user; and a controller configured to determine a blind region, which cannot be seen by the user at a current position of the user, within the curved display surface based on the current position of the user detected by the detector, and to control the processor to adjust a display state of the image displayed on the curved display surface in accordance with the determined blind region.

18 Claims, 14 Drawing Sheets

(51) Int. Cl.
*G06F 3/147* (2006.01)
*G06K 9/00* (2006.01)
*G06T 3/00* (2006.01)
*G06T 3/40* (2006.01)
*G09G 5/00* (2006.01)

(52) U.S. Cl.
CPC .............. *G06T 3/40* (2013.01); *G09G 5/003* (2013.01); *H04N 13/366* (2018.05); *G09G 2320/0261* (2013.01); *G09G 2340/04* (2013.01); *G09G 2354/00* (2013.01); *G09G 2358/00* (2013.01); *G09G 2380/02* (2013.01)

(58) Field of Classification Search
CPC ........... G09G 2354/00; G09G 2340/04; G09G 2320/026; G06F 3/013; G06F 3/038; G06F 3/041; G06F 3/0484; G06F 3/042; G06F 3/01; G06F 3/147; H04B 1/38; G06T 15/20; G06T 3/40; G06T 3/00; H04N 13/366; G06K 9/0061
See application file for complete search history.

(56) References Cited

U.S. PATENT DOCUMENTS

| | | | |
|---|---|---|---|
| 2010/0060547 A1 | 3/2010 | Bloebaum et al. | |
| 2010/0110069 A1* | 5/2010 | Yuan | G06T 15/20 345/419 |
| 2011/0099512 A1* | 4/2011 | Jeong | G06F 3/0481 715/790 |
| 2011/0227855 A1* | 9/2011 | Kim | G02F 1/13306 345/173 |
| 2012/0235893 A1* | 9/2012 | Phillips | G06F 3/012 345/156 |
| 2014/0002419 A1* | 1/2014 | Thorson | G06F 3/147 345/175 |
| 2014/0071159 A1* | 3/2014 | Ye | G06F 3/14 345/619 |
| 2014/0085615 A1 | 3/2014 | Pretorius et al. | |
| 2014/0152553 A1* | 6/2014 | Cha | G06F 3/013 345/156 |
| 2014/0191956 A1 | 7/2014 | Suo | |
| 2014/0327694 A1* | 11/2014 | Cao | H04N 13/0422 345/597 |
| 2015/0009415 A1* | 1/2015 | Wong | G06F 3/0484 348/745 |

FOREIGN PATENT DOCUMENTS

| | | |
|---|---|---|
| EP | 2500898 A1 | 9/2012 |
| EP | 2709094 A2 | 3/2014 |
| KR | 10-2013-0015542 A | 2/2013 |

OTHER PUBLICATIONS

International Search Report dated Mar. 18, 2015 issued in corresponding International Patent Application PCT/KR2015/008627.
Australian Office Action dated Feb. 4, 2019 in corresponding Australian Patent Application No. 2015304150 (3 pages).
Australian Patent Office Action (Examination report No. 1 for standard patent application) issued in Australian Patent Application No. 2015304150 dated Oct. 4, 2019 (7 pages).
Chinese Office Action dated May 27, 2019 in corresponding Chinese Patent Application No. 201510493014.6.
European Office Action dated Oct. 14, 2019 in related European Patent Application No. 15 181 586.7.
Indian Office Action dated Jan. 14, 2020 from Indian Application No. 201727001459, 5 pages.
Chinese Office Action dated Mar. 2, 2020 from Chinese Application No. 201510493014.6, 15 pages.

* cited by examiner

DISPLAY APPARATUS AND CONTROL METHOD THEREOF

CROSS-REFERENCE TO RELATED APPLICATIONS

This application claims priority from Korean Patent Application No. 10-2014-0108546, filed on Aug. 20, 2014 in the Korean Intellectual Property Office, the disclosure of which is incorporated herein by reference.

BACKGROUND

1. Field

Apparatuses and methods consistent with the exemplary embodiments relate to a display apparatus that processes various kinds of image data and displays an image and a control method thereof, and more particularly to a display apparatus and a control method thereof, which has an improved structure for displaying an image so that a user can view the image on a blind region even though a display surface of the display apparatus for displaying an image is curved and has a blind region that is not visible to the user.

2. Description of the Related Art

A display apparatus processes an image signal received from an external image source and displays an image based on the image signal through a display panel that can be variously achieved by liquid crystal or the like. In general, the display apparatus provided to a user may include a television (TV), a monitor, etc. For example, if the display apparatus is the TV, it displays an image based on a broadcast signal transmitted from a broadcasting station through a user's desired broadcasting channel by various processes such as tuning, decoding, etc., or displays a content image based on image data received from a content provider through local/network connection.

The display panel applied to the display apparatus is generally formed as a rectangular flat surface having a substantially zero curvature, and thus has generally had a flat display structure for displaying an image on this flat surface. Further, various structures have been proposed for the display panel with development of technology. For instance, there have been proposed a transparent display structure in which a user can view an image from the front or back of the display panel, or a curved display structure in which the display panel forms a curved surface having a predetermined curvature and an image is displayed on this curved surface. In more detail, the curved display structure is classified into a rigid curved structure in which the display panel maintains a rigid curved surface, and a flexible curved structure in which a shape of a curved surface is flexible.

In contrast with the flat display structure, the curved display structure has a problem in that a user may not view the whole display surface of the display panel in accordance with his/her positions even though he/she is positioned in front of the display panel. Accordingly, if the display apparatus allows a user to recognize an image on a partial display surface, which is not seen from a current position, without having to change the current position of the user, it will be convenient for the user to use the display apparatus.

SUMMARY

A display apparatus including: a display configured to include a curved display surface; a processor configured to process an image signal to be displayed as an image on the display; a detector configured to detect a position of a user; and a controller configured to determine an blind region, which is not seen to the user at current position of the user, within the display surface based on the current position of the user detected by the detector, and control the processor to adjust a display state of the image displayed on the display surface in accordance with the determined blind region. Thus, a user can view an image, which is originally displayed on the blind region of the display, without changing the current position.

The controller may divide the display surface into the blind region and a visible region, which is seen to the user at the current position of the user, and control the image, which is displayed on the blind region in a default state, to be displayed on the visible region in accordance with the adjusted display state of the image.

The controller may entirely move the image of the blind region to the visible region. Thus, a user can view an image, which is originally displayed on the blind region, through the visible region.

The displayed image may be divided into a plurality of module images, and the controller may maintain a first module image displayed on the visible region among the plurality of module images, and move a second module image, which is displayed on the blind region among the plurality of module images, to the visible region.

The controller may move the second module image not to overlap with the first module image within the visible region.

The controller may control the processor to display the entire image on the visible region if the image is displayed on both the blind region and the visible region.

The controller may determine a resolution of the visible region, and may control the processor to adjust a scale of the image to correspond to the determined resolution of the visible region. Thus, a user can view the whole image displayed on the visible region, while the user keeps the current position.

The controller may shut off power for displaying the image in the blind region, while the image is displayed in the visible region in accordance with the adjusted display state of the image. Thus, it is possible to reduce consumption of power supplied to the display.

The controller may not adjust the display state of the image if the detector detects a plurality of users.

The controller may calculate a new position value based on an average value between position values of the plurality of users if the detector detects a plurality of users, and determines the blind region based on the calculated position value. Thus, even when a plurality of users is simultaneously detected, the blind region is properly designated to adjust a display state of an image.

A method of controlling a display apparatus, the method including: detecting a position of a user; determining an blind region, which is not seen to the user at current position of the user, within a curved display surface of the display apparatus based on the detected current position of the user; and adjusting a display state of the image displayed on the display surface in accordance with the determined blind region. Thus, a user can view an image, which is originally displayed on the blind region of the display, without changing the current position.

The determining the blind region may include: dividing the display surface into the blind region and a visible region, which is seen to the user at the current position of the user; and displaying the image, which is displayed on the blind region in a default state, on the visible region in accordance with the adjusted display state of the image.

The displaying the image on the visible region in accordance with the adjusted display state of the image may include entirely moving the image of the blind region to the visible region. Thus, a user can view an image, which is originally displayed on the blind region, through the visible region.

The displayed image may be divided into a plurality of module images, and the displaying the image on the visible region in accordance with the adjusted display state of the image may include maintaining a first module image displayed on the visible region among the plurality of module images, and moving a second module image, which is displayed on the blind region among the plurality of module images, to the visible region.

The moving the second module image to the visible region may include moving the second module image not to overlap with the first module image within the visible region.

The displaying the image on the visible region in accordance with the adjusted display state of the image may include displaying the entire image on the visible region if the image is displayed on both the blind region and the visible region.

The displaying the entire image on the visible region may include determining a resolution of the visible region, and adjusting a scale of the image to correspond to the determined resolution of the visible region. Thus, a user can view the whole image displayed on the visible region, while he/she keeps the current position.

The displaying the entire image on the visible region may include shutting off power for displaying the image in the blind region, while the image is displayed in the visible region in accordance with the adjusted display state of the image. Thus, it is possible to reduce consumption of power supplied to the display.

The sensing the position of the user may include: not adjusting the display state of the image if a plurality of users is detected.

The determining the blind region may include: calculating a new position value based on an average value between position values of the plurality of users if a plurality of users is detected; and determining the blind region based on the calculated position value. Thus, even when a plurality of users is simultaneously detected, the blind region is properly designated to adjust a display state of an image.

In another embodiment, a display having a curved display surface where an image is displayed is described. The display may include a detector to detect a position of a user with respect to the curved display surface and a hardware-based processor configured to determine a blind spot on the curved display surface based on the user's position detected by the detector and to adjust the image that is displayed on the curved display surface based on the determined blind spot. In the display, the blind spot may include a portion of the curved display surface that cannot be seen by the user from the user's position detected by the detector.

In another embodiment, a display having a curved display surface where an image is displayed is described. The display may include a detector to detect a position of one or more users with respect to the curved display surface and a hardware-based processor configured to determine a blind spot on the curved display surface based on the user's position detected by the detector and to adjust the image that is displayed on the curved display surface based on the determined blind spot if a single user is detected. In the display, if more than one user is detected by the detector, the processor does not adjust the image that is displayed on the curved display surface based on the positions of the more than one users.

In another embodiment, a display having a display surface with an adjustable curvature where an image is displayed is described. The display may include a first detector to detect a curvature amount of the display surface, a second detector to detect a position of a user with respect to the display surface, and a hardware-based processor configured to determine a blind spot on the curved display surface based on the curvature amount of the display surface detected by the first detector and the user's position detected by the second detector and to adjust the image that is displayed on the curved display surface based on the determined blind spot.

In another embodiment, a method of displaying an image on a display having a curved display surface where the image is displayed is described. The method may include detecting a position of a user with respect to the curved display surface of the display, determining, by way of a hardware-based processor, a blind spot on the curved display surface based on the detected user's position and adjusting, by way of the hardware-based processor, the image that is displayed on the curved display surface based on the determined blind spot.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, exemplary embodiments will be described in detail with reference to accompanying drawings. In the following exemplary embodiments, only elements directly related to the exemplary embodiment will be described, and descriptions about the other elements will be omitted. However, it will be appreciated that the elements, the descriptions of which are omitted, are not unnecessary to realize the apparatus or system according to the exemplary embodiments.

Figure 1:
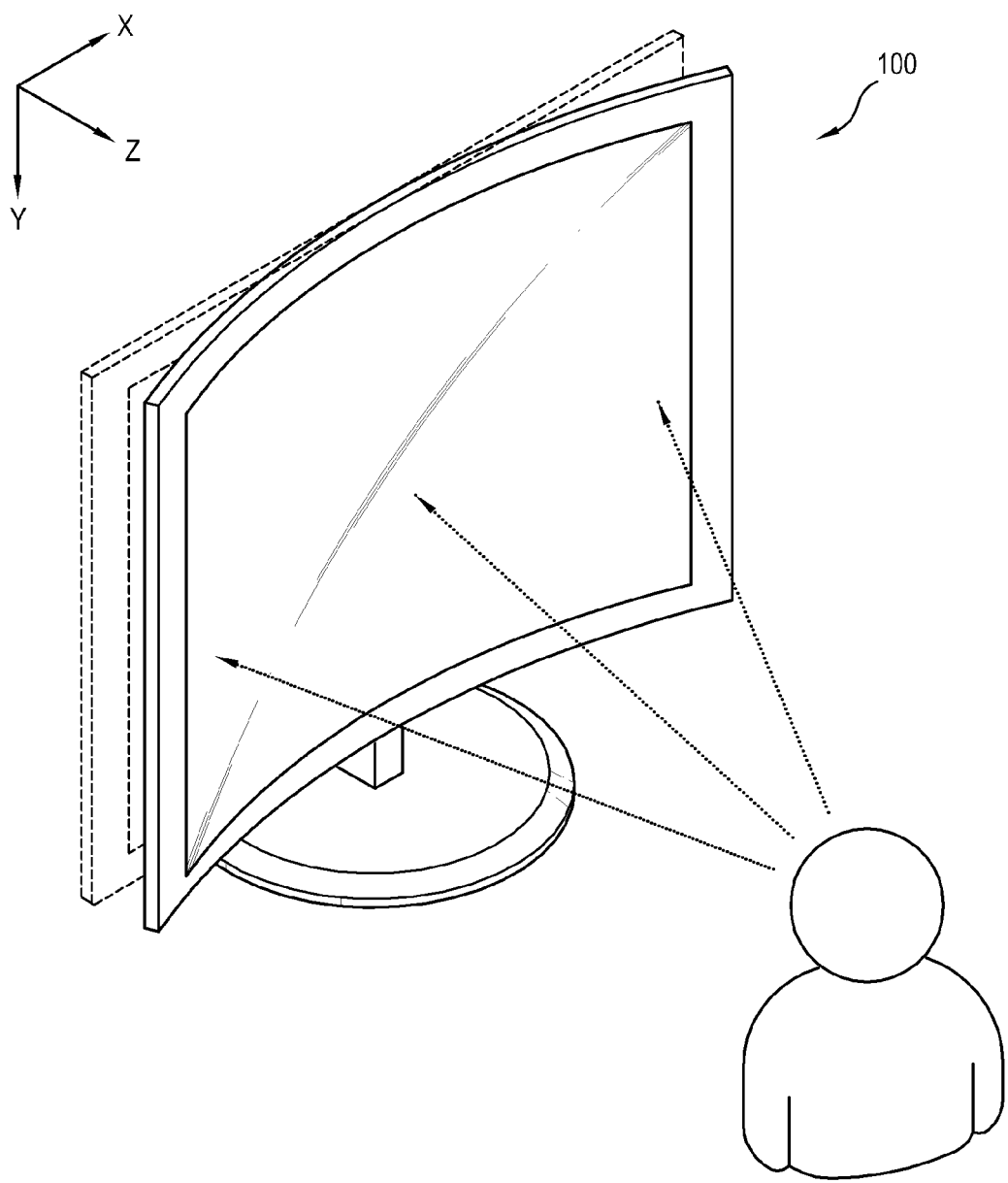
FIG. 1 shows an example of a display apparatus according to a first exemplary embodiment.

FIG. 1 shows an example of a display apparatus 100 according to a first exemplary embodiment.

Referring to FIG. 1, the display apparatus 100 according to an exemplary embodiment is achieved by a TV which is basically shaped like a rectangular plate bent to have a predetermined curvature. As compared with a flat type display, the left and right edges of display apparatus 100 are each bent toward a front of the display so as to be closer to a user and such a bent state is maintained. That is, in an embodiment the curvature of the display 100 is maintained in a fixed state.

However, this embodiment is just one of many possible examples of the display apparatus 100 according to an exemplary embodiment, and thus the display apparatus according to an exemplary embodiment is not limited to this embodiment. For example, the display apparatus 100 according to an exemplary embodiment may be bent at the left and right edges thereof to be further from the front, that is, away from the user, or the display apparatus 100 according to an exemplary embodiment may be bent at upper and lower edges thereof to be closer to or more distant from the front. Further, the display apparatus 100 need not maintain the bent state but may alternatively have a flexible structure by which the bent state is adjusted by an external force or a driving force from a variety of driving devices (not shown) provided in the display apparatus 100. Further, the display apparatus 100 may be achieved by not only the TV but also by various other devices such as a monitor, a digital sign, a tablet personal computer, a mobile device, or the like, all of which are capable of displaying an image.

First, directions shown in FIG. 1 are defined as follows. X, Y, Z directions respectively indicate horizontal, vertical and normal directions of the display apparatus 100. In the drawings, the display apparatus 100 is arranged on an X-Y plane formed by an axis of the X direction and an axis of the Y direction. The Z direction refers to a direction toward the front of the display apparatus 100, where a user is positioned. Further, the axis of the Z direction is perpendicular to the X-Y plane. In addition, opposite directions to the X, Y and Z directions are respectively represented as −X, −Y and −Z.

The display apparatus 100 includes a display 130 forming a display surface where an image is displayed. The display surface of the display 130 is not flat but curved. In particular, the left and right edges of the display 130 are closer to the user than those of the flat type. If the display 130 has a large screen and a flat display surface, the left and right portions of the screen are distant from a user and thus relative reality is too low to make a user recognize an image. On the other hand, if the display surface is curved according to an exemplary embodiment, a user can feel relative reality in recognizing an image.

However, if the display surface of the display 130 is curved according to an exemplary embodiment, the display surface may be partially invisible to a user in accordance with his/her positions even though he/she is positioned in front of the display apparatus 100 resulting in a blind region or blind spot.

Figure 2:
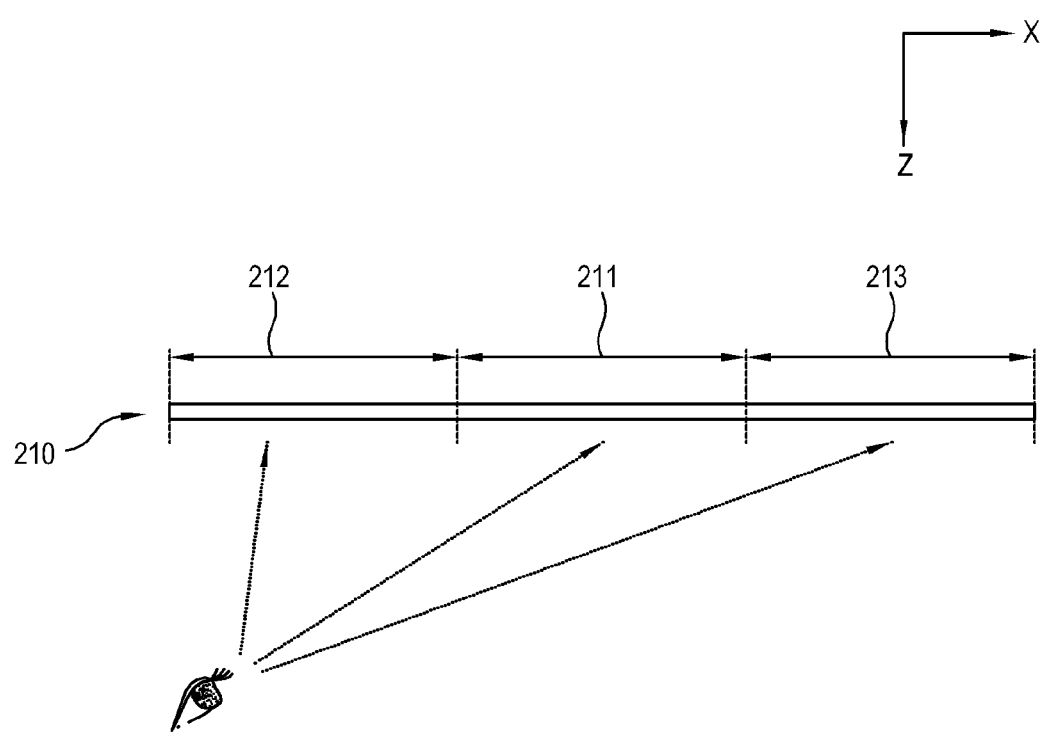
FIG. 2 is a plan view showing an example of a user's positions when a display surface is flat.

FIG. 2 is a plan view showing an example of a user's positions when a display surface 210 is flat.

As shown in FIG. 2, it will be considered that the display surface 210 is flat to be compared with that according to an exemplary embodiment. If a user is positioned at a left side in front of the display surface 210, he/she can generally view the entirety of the display surface 210 as long as he/she is positioned in front of the display surface 210. If the display surface 210 is divided into a middle region 211, a left region 212 and a right region 213 for convenience, the right region 213 is the most distant from a user. Nevertheless, a user can view the right region 213.

Figure 3:
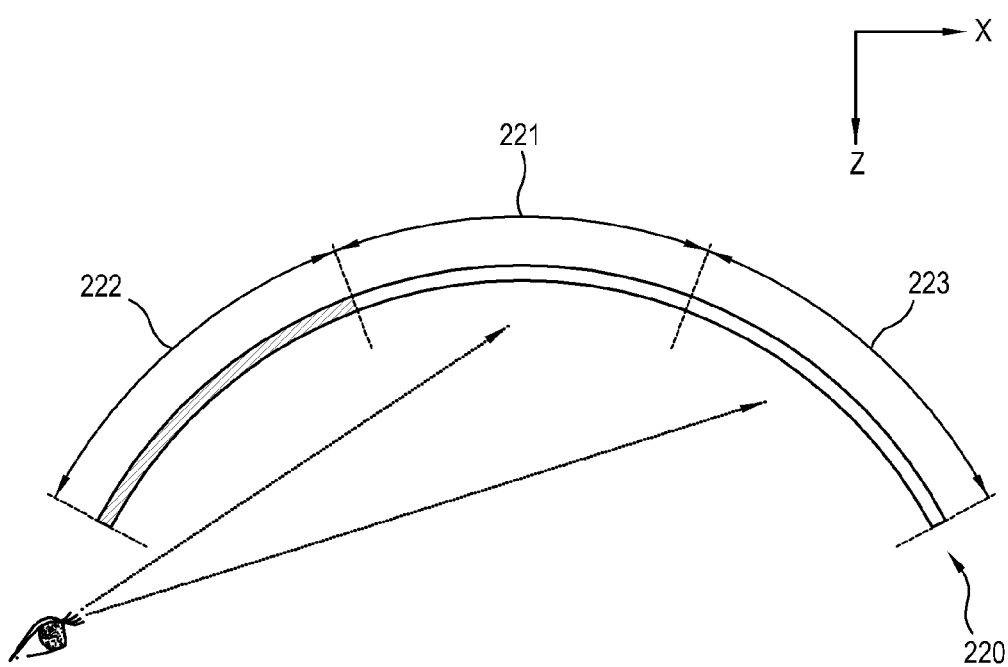
FIG. 3 is a plan view showing an example of a user's positions when a display surface has a concave curved surface in the display apparatus of FIG. 1.

FIG. 3 is a plan view showing an example of a user's positions when a display surface 220 has a concave curved surface.

As shown in FIG. 3, the display surface 220 forms a curved surface. The display surface 220 is bent in the −Z direction so that a middle region 221 can be recessed backward, thereby forming a concave curved surface in the sight of a user ahead. If a user is positioned at a left side in front of the display surface 220 like that of FIG. 2, he/she can view the middle region 221 and a right region 223 but cannot view the left region 222. On the other hand, if a user is positioned at a right side in front of the display surface 220, he/she can view the middle region 221 and the left region 222 but cannot view the right region 223. This is because the display surface 220 is not flat but curved.

Figure 4:
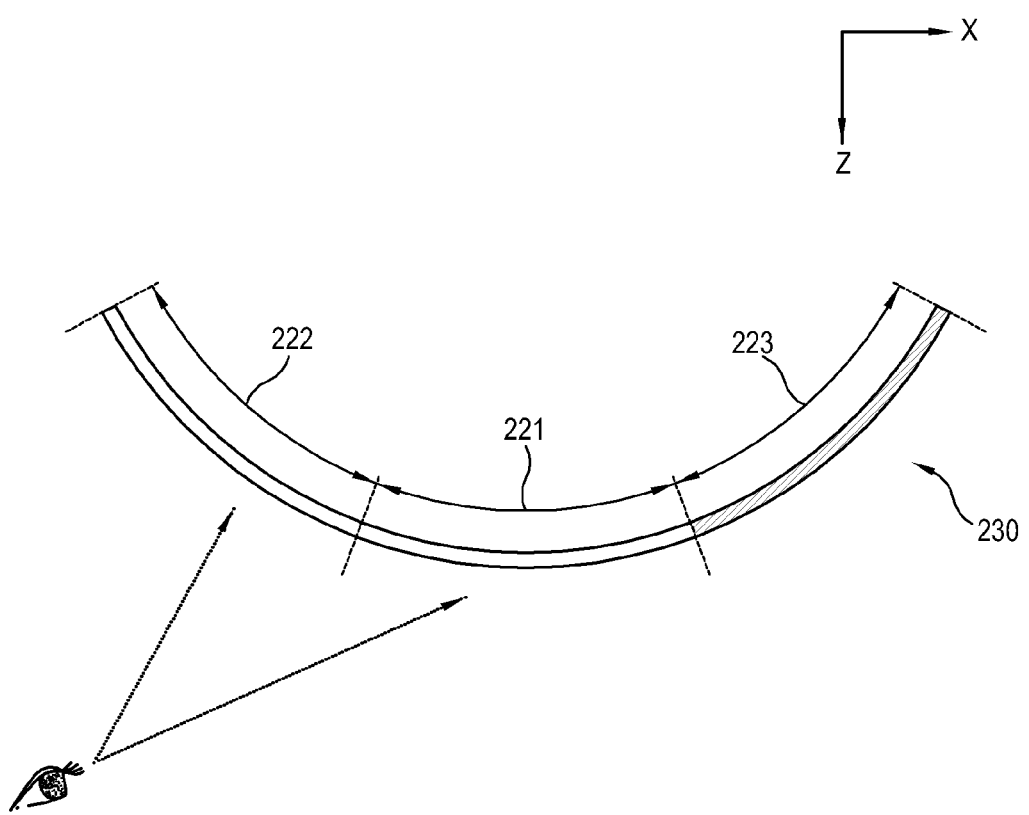
FIG. 4 is a plan view showing an example of a user's positions when a display surface has a convex curved surface in the display apparatus of FIG. 1.

FIG. 4 is a plan view showing an example of a user's positions when a display surface 230 has a convex curved surface.

As shown in FIG. 4, the display surface 230 forms a curved surface. The display surface 230 is bent in the Z direction so that a middle region 231 can protrude forward, thereby forming a convex curved surface in the sight of a user ahead. If a user is positioned at a left side in front of the display surface 230 like that of FIG. 2, he/she can view the middle region 221 and a left region 232 but cannot view the right region 233. On the other hand, if a user is positioned at a right side in front of the display surface 230, he/she can view the middle region 221 and the right region 233 but cannot view the left region 232.

On the contrary to the flat display surface, the curved display surface is curved, a blind region may be formed in accordance with a user's positions. For convenience, the blind or invisible region refers to an region, which is not seen to a user at/her current position, within the entire display region of the display surface, and the visible region refers to the other region which is seen to him/her. If a certain image is displayed on the blind region, a user cannot view the image through a conventional display apparatus unless he/she changes the current position.

For example, suppose a user presses a predetermined button of a remote controller (not shown) so that a menu image can be displayed in FIG. 3. If the default of the display apparatus 100 is set to make the menu image be slid from the left edge of the display surface 220 and displayed on the left region 222, a user cannot view the menu image since the left region 222 is the blind region. Further, if a certain image is displayed on the entirety of the display surface 220, a user cannot view a partial image displayed on the blind region, i.e. the left region 222.

In this regard, an exemplary embodiment allows a user to view an image displayed on the blind region 222 without changing the current position even though the display surface 220 is curved.

Figure 5:
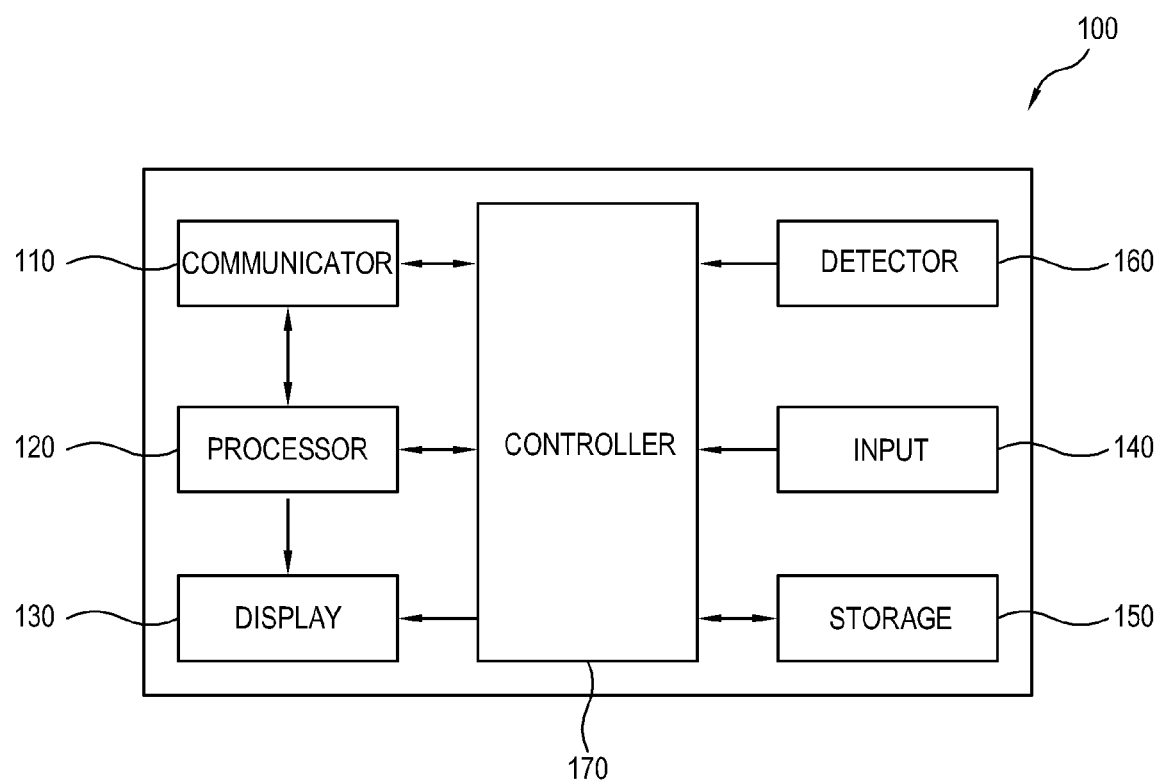
FIG. 5 is a block diagram of the display apparatus of FIG. 1.

FIG. 5 is a block diagram of the display apparatus 100.

As shown in FIG. 5, the display apparatus 100 includes a communicator 110 which communicates with the exterior to transmit and receive data/a signal, a processor which processes the data received in the communicator 110 in accordance with preset processes, a display 130 which displays an image based on image data processed by the processor 120, an input 140 which receives a user's input operation, a storage 150 which stores data, a detector 160 which detects a user's position, and a controller 170 which controls general operations of the display apparatus 100 such as the processor 120.

The communicator 110 transmits and receives data locally or through a network so that the display apparatus 100 can interactively communicate with the exterior. For example, the communicator 110 connects with an external device (not shown) through wired/wireless wide region network in accordance with preset communication protocols. The communicator 110 may be achieved by a connection port based on communication standards or a set of connection modules, and therefore the protocol for connection or an external device (not shown) to be connected is not limited to one kind or type. The communicator 110 may be built in the display apparatus 100, or the whole or some elements of the communicator 110 may be additionally installed in the form of add-on or dongle in the display apparatus 100.

The communicator 110 may transmit and receive a signal based on individual communication protocols with respect to respective connected devices. In the case of the image data, the communicator 110 may transmit and receive a signal based on various standards such as radio frequency (RF), composite/component video, super video, Syndicat des Constructeurs d'Appareils Radiorécepteurs et Téléviseurs (SCART), high definition multimedia interface (HDMI), DisplayPort, unified display interface (UDI), wireless high definition (HD), etc.

The processor 120 performs various processes to data or to a signal received in the communicator 110. If the image data is received in the communicator 110, the processor 120 performs video processing to the image data and outputs the processed image data to the display 130, thereby allowing the display 130 to display an image based on the image data. Alternatively, if a broadcast signal is received in the communicator 110 tuned to a certain channel, the processor 120 extracts video, audio and data such as metadata from the broadcast signal and adjusts the image to have a preset resolution so that the display 130 can display the image.

There is no limit to the kind of video processing performed by the processor 120, and the video processing may for example include decoding corresponding to image formats of image data, de-interlacing for converting image data from an interlaced type into a progressive type, frame refresh rate conversion, scaling for adjusting the image data to have a preset resolution, noise reduction for improving image quality, detail enhancement, frame refresh rate conversion, etc.

The processor 120 may perform various processes in accordance with the kind and properties of data, and therefore the process of the processor 120 is not limited to the video processing. Further, the data that can be processed by the processor 120 is not limited to data received in the communicator 110. For example, if a user's speech is input to the display apparatus 100, the processor 120 may process the speech in accordance with preset audio processing. The processor 120 may be achieved in the form of a system-on-chip (SoC) where various functions corresponding to such processes are integrated into a single package, or an image processing board where individual chip-sets for independently performing the respective processes are mounted to a printed circuit board. Thus, the display apparatus 100 may include the built-in processor 120.

The display 130 displays an image based on an image signal/image data processed by the processor 120. The display 130 may be variously achieved without limitation. According to an exemplary embodiment, the display 130 has a curved display surface.

The input 140 may send the controller 170 a variety of preset control commands or information in response to a user's operation or inputs. The input 140 sends the controller 170 various informatization events generated by a user in accordance with a user's intention and transmits it to the controller 170. The input 140 may be achieved in various forms for generating input information from a user. For example, the input 140 may include a key or a button installed outside the display apparatus 100, a remote controller provided remotely and separately from a main body of the display apparatus 100 and communicating with the communicator 110, or a touch screen integrated with the display 130.

The storage 150 stores a variety of data under control of the controller 170. The storage 150 may be achieved by a flash-memory, a hard-disc drive a nonvolatile memory, or the like to preserve data regardless of supply of system power. The storage 150 is accessed by the processor 120 or the controller 160 and performs reading, writing, editing, deleting, updating or the like with regard to data.

The detector 160 detects a user's current position with respect to the display apparatus 100. The detector 160 detects how far and what direction a user is from a certain portion of or position of the display apparatus 100. For example, the detector 160 may detect a distance and an angle from a preset reference position on the display surface of the display 130 to a position of a user. The detector 160 sends a detection result to the controller 170, so that the controller 170 can determine a user's current position based on the detection result. To this end, the detector 160 may be achieved using a variety of devices and methods. For example, the detector 160 may be achieved with a variety of different sensors such as a camera, a heat detector, a sensor for sensing a position of a certain object by projecting an infrared ray, a sound wave, etc.

The controller 170 may be achieved using a central processing unit (CPU), and may control operations of the display apparatus 100 in response to occurrence of a certain event. For example, the controller 170 controls the processor 120 to process image data of a certain content and the display 130 to display an image based on the processed image data when the image data is received in the communicator 110. Further, the controller 170 controls elements such as the processor 120 to perform an operation previously set corresponding to the corresponding event if a user's input event occurs through the input 140.

With this structure, the controller 170 according to an exemplary embodiment determines the blind region in the whole display surface of the display 130 based on a user's current position detected by the detector 160, and adjusts a display state of an image on the display surface in accordance with the determined blind region. For example, the controller 170 determines which portion of the entire display surface of the display 130 is a blind region or blind spot for the user based on the user's current position detected by the detector 160, and adjusts a display state of an image on the display surface in accordance with the determined blind spot.

Thus, the display apparatus 100 provides an image, which is displayed in the blind region in a default state, so that a user can view the image in the current position without moving from his/her current position. That is, the display apparatus 100 displays an image, which would otherwise be displayed in the blind region in a default state based on the user's current position, in a portion of the display other than the blind spot, so that a user can view the image in the user's current position without having to move.

Figure 6:
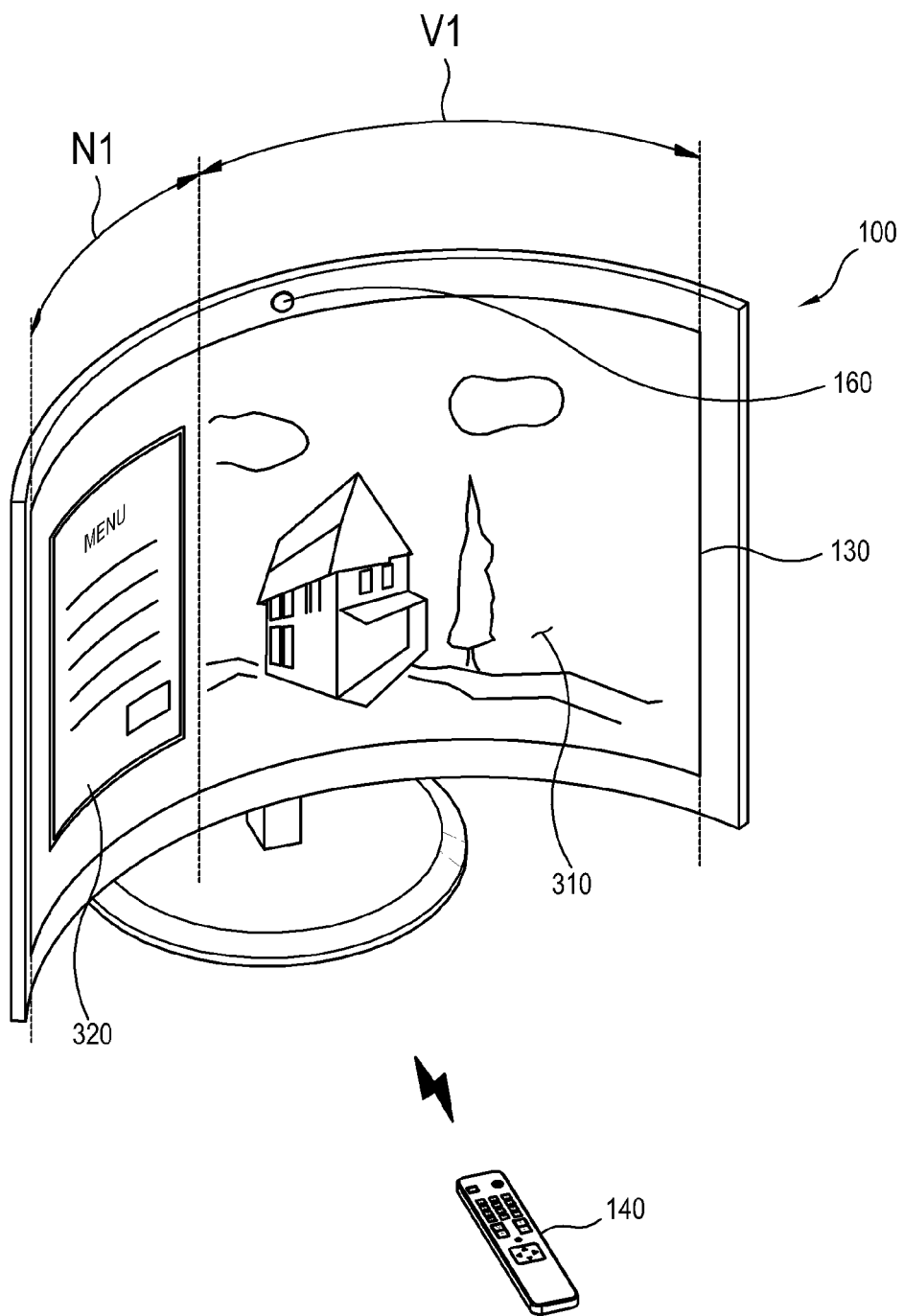
FIG. 6 shows an example of displaying a content image and a UI image on a display when the display apparatus of FIG. 1 is in a default state.

FIG. 6 shows an example of displaying a content image 310 and a user interface (UI) image 320 on the display 130 when the display apparatus 100 is in the default state.

As shown in FIG. 6, for instance, while a first image, e.g., the content image 130 is displayed on the display 130, a user may operate the input 140 so as to view a second image, e.g., the UI image 320. In the default state, the display apparatus 100 may display the UI image 320 at the left region of the whole display surface of the display 130.

In this exemplary embodiment, the first image and the second image are respectively the content image 310 and the UI image 320, but are not limited thereto. For example, the second image may include various kinds of images such as a separate content image as well as the UI image 320.

If an event for displaying the UI image 320 occurs through the input 140, the detector 160 detects a user's current position. That is, if a user via the input 140 causes the UI image 320 to be displayed, the detector 160 detects a user's current position. The display apparatus 100 divides the whole display surface into a blind region N1 and a visible region V1 in accordance with a user's current position based on the detection result of the detector 160.

The display apparatus 100 determines whether a region of displaying the UI image 320 is the blind region N1 or the visible region V1. For example, the display apparatus 100 may determine the region of displaying the UI image 320 as the blind region N1 when a percentage of an area of the UI image 320 that occupies the blind region N1, out of the total area of the UI image 320, exceeds a preset threshold.

If it is determined that the UI image 320 is displayed on the visible region V1, the display apparatus 100 displays the UI image 320 as it is in the default state. On the other hand, if it is determined that the UI image 320 is displayed on the blind region N1, the display apparatus 100 operates as follows.

Figure 7:
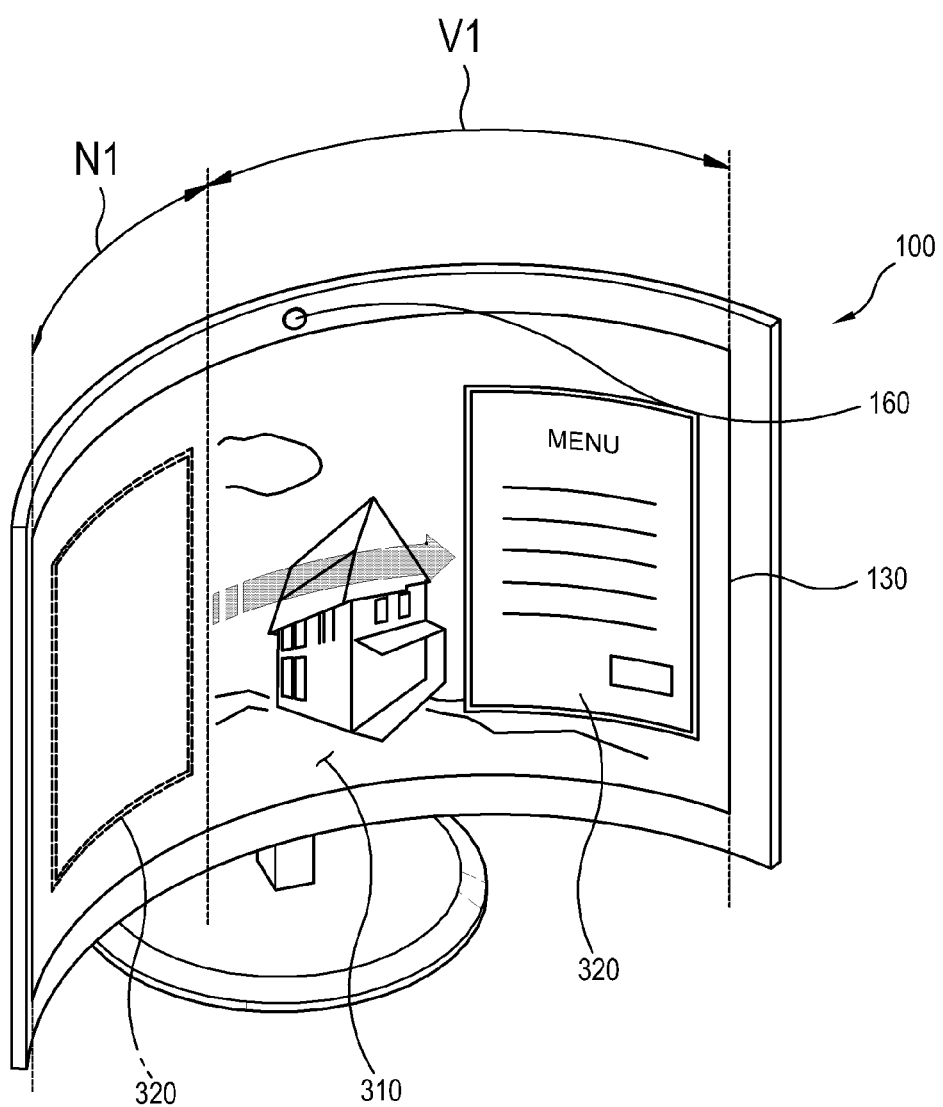
FIG. 7 shows an example of adjusting a display state of the UI image in accordance with a blind region determined by the display apparatus of FIG. 1.

FIG. 7 shows an example of adjusting a display state of the UI image 320 as it is determined that the display apparatus 100 determines the blind region N1.

As shown in FIG. 7, the display apparatus 100 determines the blind region N1 in the whole display surface of the display 130 in accordance with a user's current position. If it is determined that the UI image 320 is displayed on the blind region N1, the display apparatus 100 moves the UI image 320 from the blind region N1 to the visible region V1. For example, the display apparatus 100 may superimpose the UI image 320 over the content image 310. Thus, the display apparatus 100 adjusts the display state of the UI image 320 so that a user can view the UI image 320 even though he/she does not move from the current position, that is, without necessitating that the user move from the current position.

Below, a method of controlling the display apparatus 100 according to an exemplary embodiment will be described with reference to FIG. 8.

Figure 8:
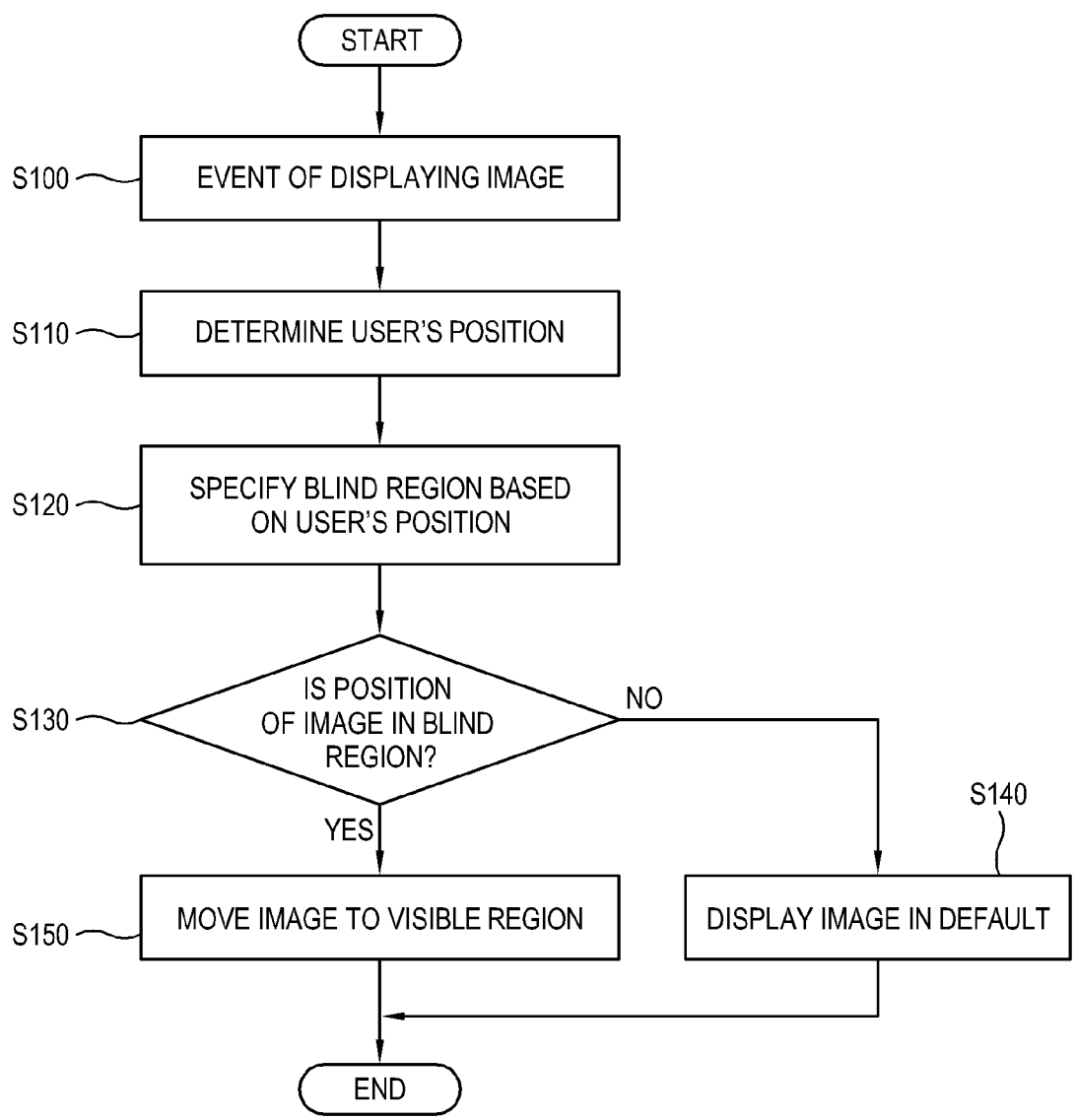
FIG. 8 is a flowchart showing a control method of the display apparatus of FIG. 1.

FIG. 8 is a flowchart showing a control method of the display apparatus 100.

As shown in FIG. 8, if an event of displaying an image occurs at operation S100, the display apparatus 100 determines a user's position at operation S110.

At operation S120, the display apparatus 100 determines a blind spot or blind region in the display surface based on a user's position. That is, the display apparatus 100 determines whether the user is unable to view all of a particular portion of the display surface due to the user's position. For example, straight lines are drawn between a user's position and a plurality of preset reference positions on the curved display surface, and a region, to which the reference position at which the straight line intersects with the display surface among the plurality of reference positions belongs, is determined as the blind region. However, this is merely an example. Alternatively, the blind region may be determined in a variety of different ways.

At operation S130, the display apparatus 100 determines whether or not a position of displaying an image in the default is the blind region.

If it is determined in the operation S130 that the position of displaying an image is not the blind region, at operation S140 the display apparatus 100 displays the image in the default, e.g., as a default state or mode.

On the other hand, if it is determined in the operation S130 that the position of displaying an image is the blind region, at operation S150 the display apparatus 100 displays the image by moving the image to the visible region. In the operation S150, the display apparatus 100 may display an image on the visible region but not on the blind region, or may first display an image on the blind region and then move the image to the visible region. For example, the display apparatus 100 may first display the image on the blind region and then display the image on the visible region by itself, may superimpose the image over another image display on the visible region, or may display both the image and the other image in a shared manner on the visible region.

In the foregoing embodiment, the display apparatus 100 moves the entirety of the UI image to the visible region. However, the display apparatus 100 may use various other methods of adjusting a display state of an image depending on types of the image, which will be described below.

Figure 9:
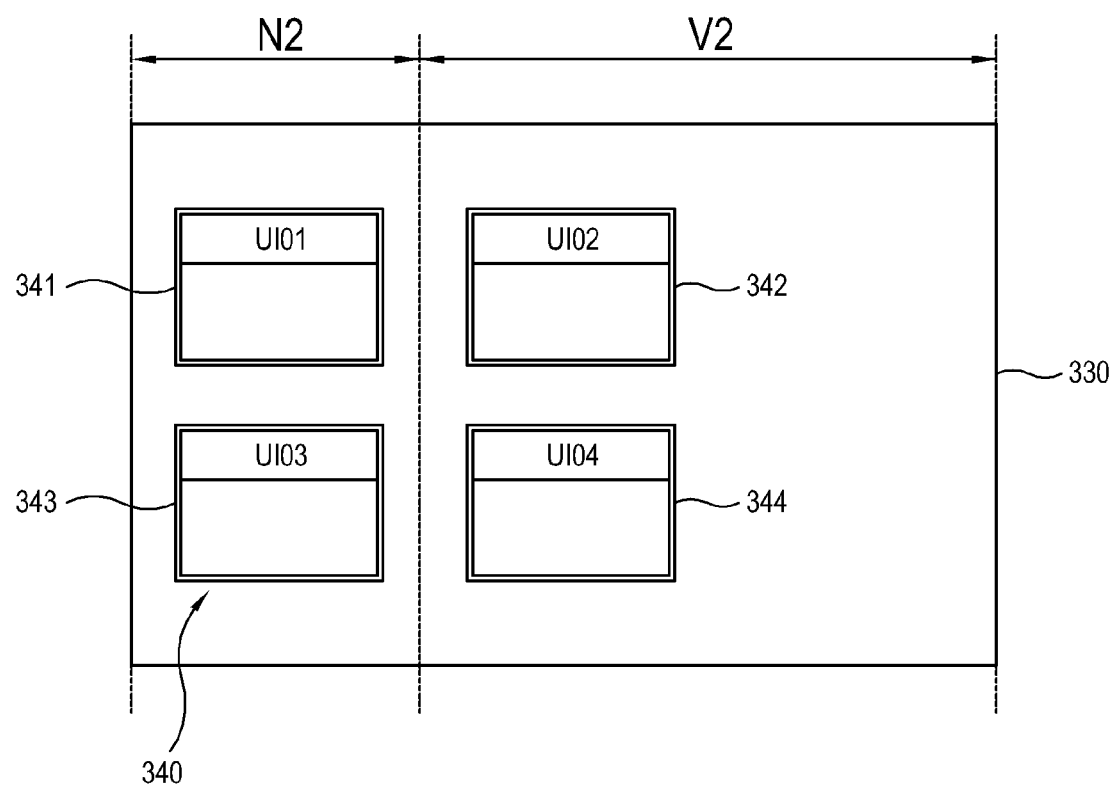
FIG. 9 and FIG. 10 show an example of adjusting a display state of an image in a display apparatus according to another exemplary embodiment.
Figure 10:
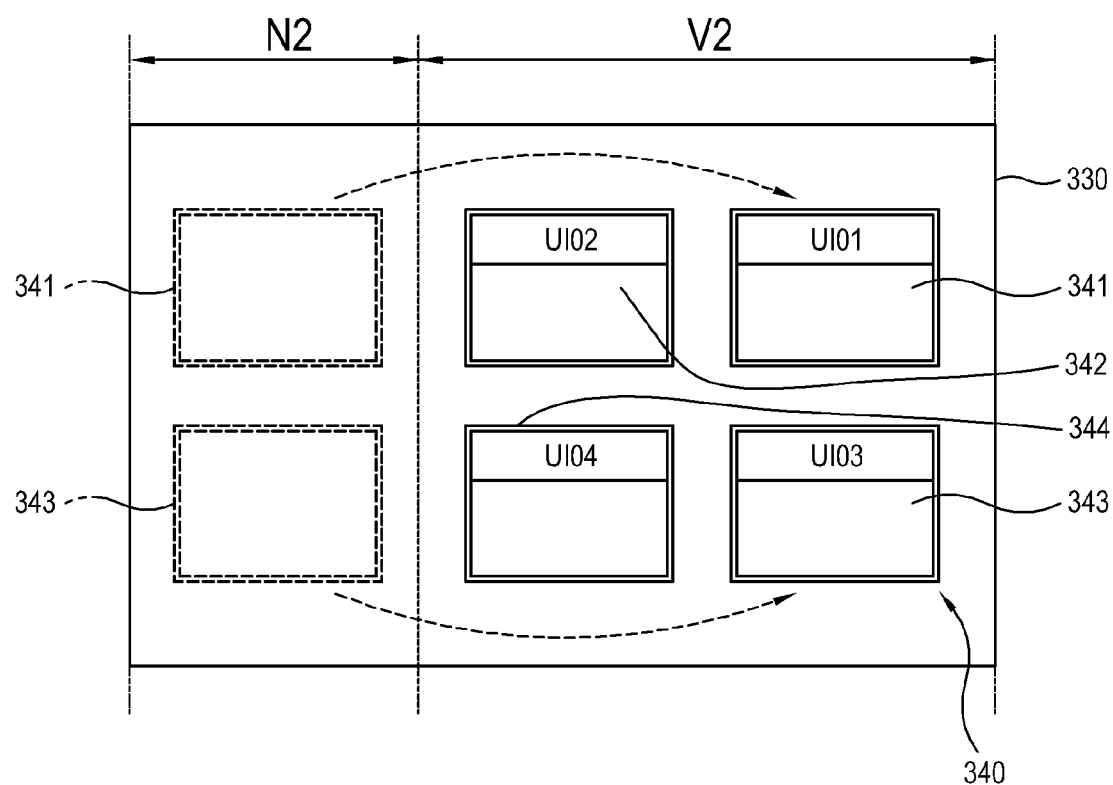

FIG. 9 and FIG. 10 show an example of adjusting a display state of an image 340 in a display apparatus 100 according to another exemplary embodiment. For simplicity and clarity, FIGS. 9 and 10 show the display surface as if it is flat. However, the display surface is actually curved.

Referring to FIG. 9, the image 340 is displayed on a display surface 330 as a plurality of module images rather than as a single image. For example, the image 340 may include UI images classified into a plurality of categories.

The display apparatus 100 displays the image 340 including the plurality of module images 340 on the display surface 330 in accordance with the default state.

The display apparatus 100 divides the display surface 330 into the blind region N2 and the visible region V2 in accordance with a user's position. When the blind region N2 is specified within the display surface 330, the display apparatus 100 determines which of the plurality of module images 340 is positioned in the blind region N2. In this exemplary embodiment, a first module image 341 and a third module image 343 are positioned in the blind region N2, and a second module image 342 and a fourth module image 344 are positioned in the visible region V2.

Thus, the display apparatus 100 may adjust the display state of the image 340 as shown in FIG. 10 so that a user can view the first module image 341 and the third module image 343.

As shown in FIG. 10, the display apparatus 100 displays the second module image 342 and the fourth module image 344 without changing their positions. On the other hand, the display apparatus 100 displays the first module image 341 and the third module image 343 by moving the first module image 341 and the third module image 343 to be displayed in a portion of the visible region V2 other than where the second module image 342 and the fourth module image 344 are displayed. That is, the display apparatus 100 moves the first module image 341 and the third module image 343 so as not to overlap with the second module image 342 and the fourth module image 344. Since the first module image 341 and the third module image 343 are moved from the blind region N2 to the visible region V2, a user can view the entirety of the image 340 without moving from his/her current position.

Figure 11:
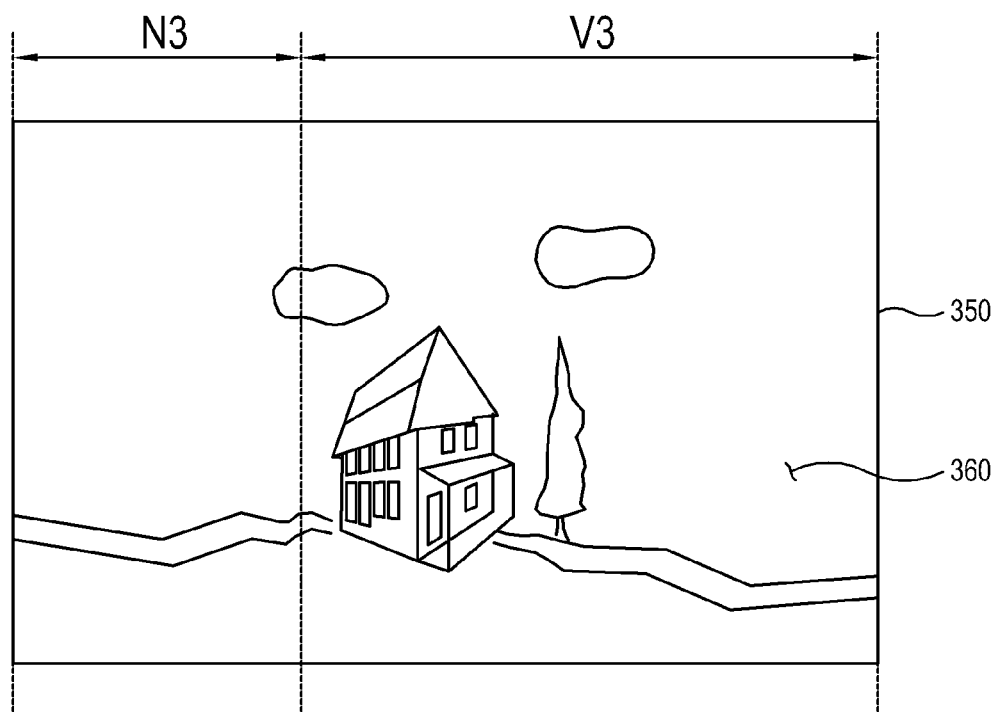
FIG. 11 and FIG. 12 show an example of adjusting a display state of an image in a display apparatus according to another exemplary embodiment.
Figure 12:
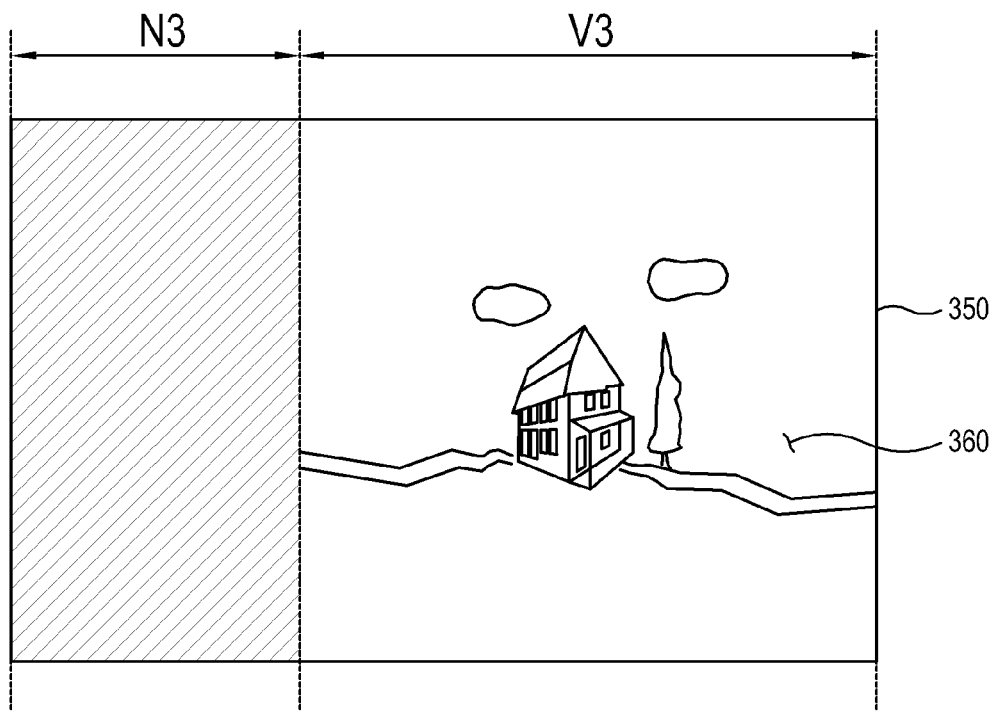

FIG. 11 and FIG. 12 show an example of adjusting a display state of an image 360 in a display apparatus 100 according to another exemplary embodiment Referring to FIG. 11, the display apparatus 100 displays the image 360 on the entirety of a display surface 350. In this exemplary embodiment, the image 360 is displayed throughout the display surface 350, but not limited thereto. Alternatively, the image 360 may be an image that is not displayed on both the blind region N3 and the visible region V3.

The display apparatus 100 divides the display surface 350 into the blind region N3 and the visible region V3 in accordance with a user's position. If the blind region N3 is specified in the display surface 350, the display apparatus 100 determines the number of horizontal and vertical pixels corresponding to the visible region V3 or the resolution of the visible region V3.

Further, the display apparatus 100 processes the image 360 to have the same resolution as the determined resolution of the visible region V3 and displays the processed image 360 as shown in FIG. 12.

As shown in FIG. 12, if the visible region V3 is specified in the display surface 350, the display apparatus 100 adjusts the display state of the image 360, previously displayed on both the blind region N3 and the visible region V3, to be displayed on just the visible region V3. For example, the display apparatus 100 resizes the image 360 to fit optimally in the visible region V3 when the image 360 is displayed only in the visible region V3 and not in the blind region N3.

There may be various methods of adjusting the display state of the image 360. For example, only the horizontal width of the image 360 may be reduced to correspond to the horizontal width of the visible region V3, or the image 360 may be reduced to correspond to the visible region V3 while maintaining its aspect ratio.

The display apparatus 100 adjusts a scale of the image 360 to correspond to the determined resolution of the visible region V3 and displays the adjusted image 360 on the display surface 350. Thus, a user can view the entirety of the image 360 displayed on the display apparatus 100 without changing his/her current position.

While the image 360 is displayed on the visible region V3, the display apparatus 100 does not display the image 360 on the blind region N3. If the display apparatus 100 supports a local dimming function, the display apparatus 100 may shut off power supplied to the blind region N3 for displaying an image, thereby decreasing power consumption.

In the foregoing exemplary embodiments, one user views the display apparatus 100, but not limited thereto. Alternatively, a plurality of users may view the display apparatus 100.

The display apparatus 100 does not adjust the display state of the image if a plurality of users is detected, but may adjust the display state of the image when one user is detected.

Further, the display apparatus 100 may specify the blind region within the display surface in accordance with a preset algorithm when a plurality of users is detected. This will be described with reference to FIG. 13.

Figure 13:
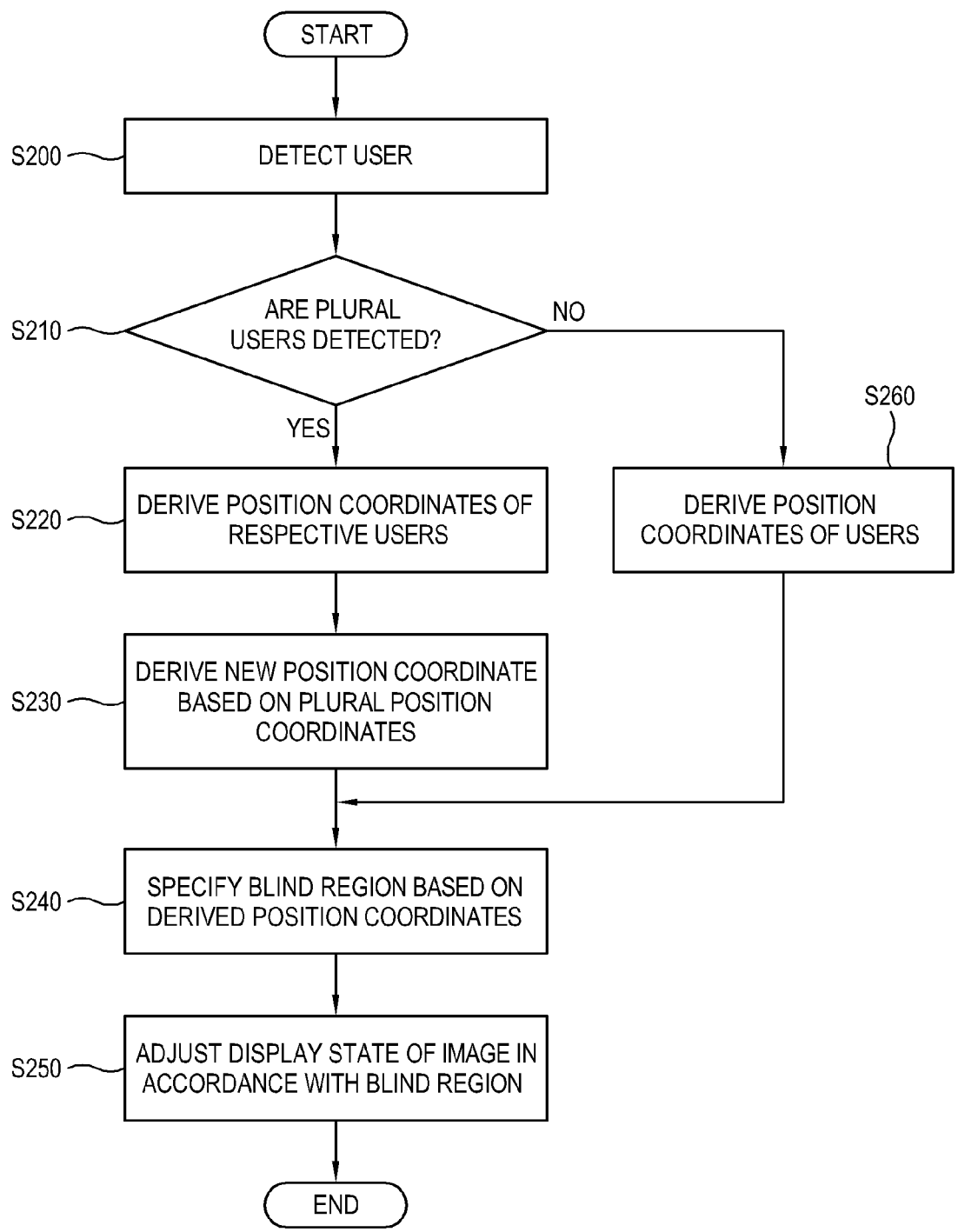
FIG. 13 is a flowchart showing a method by which the display apparatus specifies a blind region in accordance with the number of users according to another exemplary embodiment.

FIG. 13 is a flowchart showing a method by which the display apparatus specifies a blind region in accordance with the number of users according to another exemplary embodiment.

As shown in FIG. 13, the display apparatus 100 detects a user at operation S200, and determines the number of users at operation S210.

If it is determined in the operation S210 that there is a plurality of users, the display apparatus 100 determines position coordinates or position values of respective users at operation S220. At operation S230, the display apparatus 100 derives new position coordinates based on the plurality of position coordinates.

The display apparatus 100 derives new position coordinates or position values by operating the plurality of position coordinates in accordance with a variety of preset algorithms. For example, the display apparatus 100 may determine new position coordinates by calculating average values of the respective position coordinates. The display apparatus 100 may determine median position coordinates between the respective position coordinates as new position coordinates. Here, the calculation of average values may be achieved by an algorithm or function that has various mathematical meanings.

The display apparatus 100 specifies the blind region within the display surface based on the previously derived position coordinates at operation S240, and adjusts the display state of the image in accordance with the blind region at operation S250. The methods of specifying the blind region and adjusting the display state of the image are the same as mentioned above.

On the other hand, if it is determined in the operation S210 that there is one user, the display apparatus 100 derives his/her position coordinates at operation S260 and performs the operation S240.

According to an exemplary embodiment, the display apparatus 100 can specify the blind region in the display surface and adjust the display state of the image even though a plurality of users is detected.

In the foregoing exemplary embodiments, the display apparatus 100 has a curved display surface which maintains a preset curvature. However, an exemplary embodiment may be applied to a display apparatus having a flexible curvature.

Figure 14:
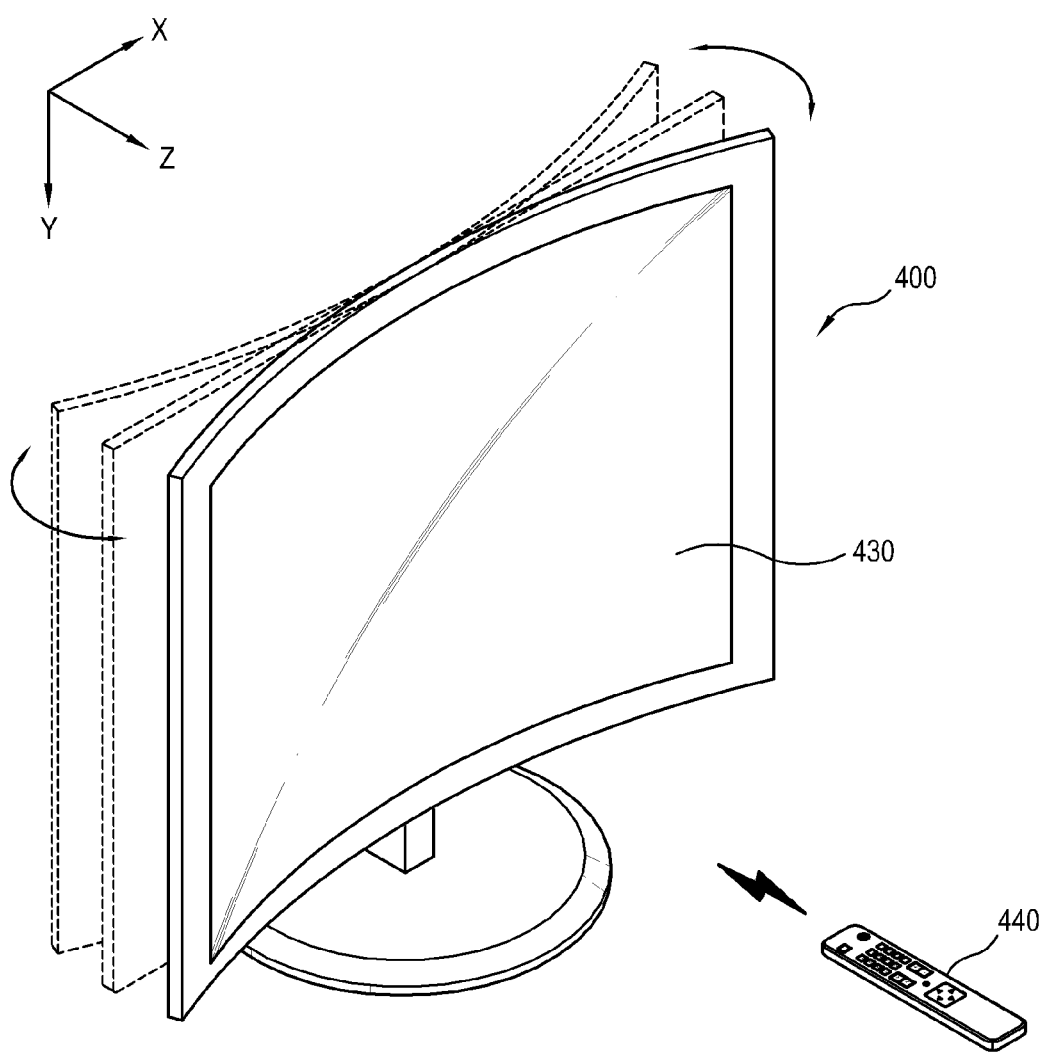
FIG. 14 shows an example of a display apparatus according to another exemplary embodiment.

FIG. 14 shows an example of a display apparatus 400 according to another exemplary embodiment.

As shown in FIG. 14, the display apparatus 400 according to the exemplary embodiment includes a display 430 having a flexible structure, which can be freely bent by external force. The display apparatus 400 includes a separate frame (not shown) and a motor (not shown) in order to bend the display 430, so that the display 430 can be bent to have a curvature in a desired direction in response to a user's control to the motor (not shown) through the input 440.

As described above, the display apparatus 400 determines a user's position so as to adjust a display state of an image. Although a user does not move from the determined position, the blind region in the whole display surface of the display 430 is varied depending on the bending state of the display 430. Therefore, the display apparatus 400 specifies the blind region in consideration of a current bending state of the display 430 and a user's position.

The display apparatus 400 does not detect or determine a user's position if the display 430 is substantially flat, but detects or determines a user's position if the display 430 is curved.

In the foregoing exemplary embodiments, the display apparatus includes the display surface having a curvature on the X-Y plane with respect the Y axis. However, the display apparatus according to an exemplary embodiment may include a display surface having a curvature on the Y-Z plane with respect to the X axis. On the contrary that the display surface of the foregoing embodiments is curved at the left and right edges thereof, the display surface may be alternatively curved at upper and lower edges thereof. If the display surface is curved at the upper and lower edges thereof, a blind region is formed in not left and right portions but upper and lower portions on the display surface.

One or more embodiments have been described herein with reference to block diagrams or flowchart illustrations of display control method. Each block of the flowchart illustrations, and combinations of blocks in the flowchart illustrations may be implemented by hardware devices or by program instructions. These program instructions may be provided to a processor, e.g., of a general purpose computer, special purpose computer, or other programmable data processing apparatus to produce a machine, such that the instructions, which execute via the processor of the computer or other programmable data processing apparatus, create techniques for implementing the functions specified in the flowchart block or blocks. These program instructions may also be stored in a computer usable or computer-readable memory that may direct a hardware-based computer, processor, or other programmable data processing apparatus to function in a particular manner, such that the instructions stored in the computer usable or computer-readable memory produce an article of manufacture including instructions that implement the operation specified in the flowchart block or blocks. The program instructions may also be loaded onto a computer, processor, or other programmable data processing apparatus to cause a series of operations to be performed on the computer or other programmable apparatus to produce a computer implemented process such that the instructions that execute on the computer or other programmable apparatus implement the operations specified in the flowchart block or blocks.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a curved display;
a detector configured to detect a first position of a user with respect to the curved display apparatus; and
a processor configured to:
control the curved display to display a plurality of images on the curved display, the plurality of images having a first image and a second image;
identify a non-visible region of the curved display and a visible region of the curved display based on the detected first position of the user, the identified visible region being viewable from the detected first position by the user, the identified non-visible region being not viewable by the user from the detected first position but viewable by the user from a second position with respect to the display apparatus;
identify which of the non-visible region and the visible region that the first image and the second image are displayed on;
based on the first image being displayed on the identified visible region and the second image being displayed on the identified non-visible region, identify a first area of the identified visible region which the first image is currently displayed on, and a second area of the identified visible region which the first image is not currently displayed on, the first area and the second area being different from each other; and
move the second image from the identified non-visible region to the second area of the identified visible region based on the detected first position of the user, while displaying the first image on the first area so that the second image is displayed without overlapping with the first image.

2. The display apparatus according to claim 1, wherein the processor is configured to move the second image from the identified non-visible region to the identified visible region thereby displaying the second image on the identified visible region without displaying the second image on the identified non-visible region.

3. The display apparatus according to claim 1, wherein the processor is configured to move all images including the second image that are displayed on the identified non-visible region to the identified visible region and display on the identified visible region.

4. The display apparatus according to claim 1, wherein the processor is configured to identify a resolution of the identified visible region, and to adjust a scale of the plurality of images to correspond to the identified resolution of the identified visible region.

5. The display apparatus according to claim 1, wherein the processor is configured to shut off power for displaying the second image in the identified non-visible region while the second image is displayed on the identified visible region.

6. The display apparatus according to claim 1, wherein the processor is configured not to adjust a display state of the second image when the detector detects a plurality of users.

7. The display apparatus according to claim 1, wherein, the processor is configured to identify a new position value based on an average value between position values of a plurality of users when the detector detects the plurality of users, and identifies the identified non-visible region based on the identified new position value.

8. The display apparatus according to claim 1, wherein edges of the curved display is bendable towards the user or away from the user to adjust a curvature of the curved display.

9. A method of controlling a display apparatus having a curved display, the method comprising:
detecting a first position of a user with respect to the curved display;
controlling, by a processor, the curved display to display a plurality of images on the curved display, the plurality of images having a first image and a second image;
identifying a non-visible region and a visible region of the curved display based on the detected first position of the user, the identified visible region being viewable from the detected first position by the user, the identified non-visible region being not viewable by the user from the detected first position but viewable by the user from a second position with respect to the display apparatus;

identifying which of the non-visible region and the visible region that the first image and the second image are displayed on;

based on the first image being displayed on the identified visible region and the second image being displayed on the identified non-visible region, identifying a first area of the identified visible region which the first image is currently displayed on, and a second area of the identified visible region which the first image is not currently displayed on, the first area and the second area being different from each other; and moving the second image from the identified non-visible region to the second area of the identified visible region based on the detected first position of the user, while displaying the first image on the first area so that the second image is displayed without overlapping with the first image.

10. The method according to claim 9, wherein the moving of the second image further comprises moving the second image from the identified non-visible region to the identified visible region thereby displaying the second image on the identified visible region without displaying the second image on the identified non-visible region.

11. The method according to claim 9, wherein the moving of the second image further comprises moving all images including the second image that are displayed on the identified non-visible region to the identified visible region and display on the identified visible region.

12. The method according to claim 9, further comprising identifying a resolution of the identified visible region, and adjusting a scale of the plurality of images to correspond to the identified resolution of the identified visible region.

13. The method according to claim 9, further comprising shutting off power for displaying the second image on the identified non-visible region, while the plurality of images is displayed on the identified visible region.

14. The method according to claim 9, wherein the detecting of the first position of the user comprises:

not adjusting a display state of the plurality of images when a plurality of users is detected.

15. The method according to claim 9, wherein the identifying of the non-visible region comprises:

identifying a new position value based on an average value between position values of the plurality of users when a plurality of users is detected; and identifying the non-visible region based on the identified new position value.

16. The method according to claim 9, further comprising bending edges of the curved display towards the user or away from the user to adjust a curvature of the curved display.

17. A display apparatus having a curved display with an adjustable curvature where an image is displayed, the curved display apparatus comprising:

a first detector to detect a curvature amount of the curved display;

a second detector to detect a first position of a user with respect to the curved display apparatus; and a processor configured to:

control the curved display to display a plurality of images on the curved display, identify a non-visible region and a visible region of the curved display based on the detected curvature amount and the detected first position of the user, the identified visible region being viewable from the detected first position by the user, the identified non-visible region not being viewable by the user from the first position but viewable by the user at a second position with respect to the curved display apparatus;

identify which of the non-visible region and the visible region that the first image and the second image are displayed on;

based on the first image being displayed on the identified visible region and the second image is being displayed on the identified non-visible region, to identify a first area of the identified visible region which the first image is currently displayed on, and a second area of the identified visible region which the first image is not currently displayed on, the first area and the second area being different from each other; and move the second image from the identified non-visible region to the second area based on the detected first position of the user, while the first image is displayed on the first area so that the second image is displayed without overlapping with the first image.

18. The display apparatus according to claim 17, wherein edges of the curved display is bendable towards the user or away from the user to adjust the curvature of the curved display.

* * * * *